| (12) | United States Patent<br>Barsness et al. | (10) Patent No.: US 8,543,549 B2<br>(45) Date of Patent: Sep. 24, 2013 |
|---|---|---|

| (54) | NORMALIZING DATA ON DATABASE RESTORE |
|---|---|
| (75) | Inventors: Eric L. Barsness, Pine Island, MN (US); David L. Darrington, Rochester, MN (US); John M. Santosuosso, Rochester, MN (US) |
| (73) | Assignee: International Business Machines Corporation, Armonk, NY (US) |
| ( * ) | Notice: Subject to any disclaimer, the term of this patent is extended or adjusted under 35 U.S.C. 154(b) by 160 days. |
| (21) | Appl. No.: 12/963,675 |
| (22) | Filed: Dec. 9, 2010 |
| (65) | Prior Publication Data<br>US 2012/0150806 A1 Jun. 14, 2012 |
| (51) | Int. Cl.<br>*G06F 7/00* (2006.01) |
| (52) | U.S. Cl.<br>USPC .......................................................... 707/649 |
| (58) | Field of Classification Search<br>USPC .................................................. 707/649, 661<br>See application file for complete search history. |

(56) References Cited

U.S. PATENT DOCUMENTS 6,085,200 A * 7/2000 Hill et al. .............................. 1/1

* cited by examiner

*Primary Examiner* — Truong Vo

(74) *Attorney, Agent, or Firm* — Patterson & Sheridan LLP

(57) ABSTRACT

Techniques for normalizing a database as part of a database restore. Embodiments may receive a database restore request indicating a previous state to restore a database to. Responsive to the request, embodiments may restore the database to the previous state using backup data associated with the previous state, and normalize the restored database using historical database usage data based on one or more previous database operations.

20 Claims, 10 Drawing Sheets

900

| ORDER NUMBER | TOTAL PRICE | COMMENT |
|---|---|---|
| 116074 | 114.13 | PENDING |
| 118913 | 120.00 | PENDING |
| 115100 | 4.99 | COMPLETE |
| 116997 | 51.49 | CANCELED |
| 117043 | 73.76 | COMPLETE |
| 117459 | 194.87 | PENDING |
| 115632 | 4.99 | CANCELED |
| 119741 | 346.31 | COMPLETE |

| ORDER NUMBER | TOTAL PRICE | COMMENT |
|---|---|---|
| 116074 | 114.13 | 1 |
| 118913 | 120.00 | 1 |
| 115100 | 4.99 | 2 |
| 116997 | 51.49 | 3 |
| 117043 | 73.76 | 2 |
| 117459 | 194.87 | 1 |
| 115632 | 4.99 | 3 |
| 119741 | 346.31 | 2 |

| COMMENT ID | COMMENT STRING |
|---|---|
| 1 | PENDING |
| 2 | COMPLETE |
| 3 | CANCELED |

FIG. 11

NORMALIZING DATA ON DATABASE RESTORE

BACKGROUND

The present invention generally relates to data processing and, more particularly, to normalizing data as part of a database restore.

Databases are computerized information storage and retrieval systems. A relational database management system is a computer database management system (DBMS) that uses relational techniques for storing and retrieving data. An object-oriented programming database is a database that is congruent with the data defined in object classes and subclasses. Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

As modern databases often operate under strenuous workloads, database optimization is important to ensure that such workloads may be processed in a reasonable amount of time. One technique for optimizing a database is to optimize based on the data contained in the database and relationships between data in the database. However, such a technique may be disadvantageous, as it only accounts for the data intended to be stored in the database, regardless of how the database is used in practice. Furthermore, any such technique may require the database to be offline or otherwise inaccessible for a period of time while changes are applied to the database. However, many businesses may consider additional downtime unacceptable in production environments.

SUMMARY

Embodiments of the invention provide a method, product and system for normalizing a database as part of a database restore. The method, product and system include receiving a database restore request to restore the database to a previous state specified in the database restore request. Additionally, the method, product and system include, responsive to receiving the database restore request, restoring the database to the previous state using backup data associated with the previous state of the database specified in the database restore request. Furthermore, and also responsive to receiving the database restore request, the method, product and system include normalizing the restored database to optimize subsequent database operations. The normalization is based on historical database usage data describing how the database is used and collected based on one or more previous database operations.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 9 illustrates an unoptimized database table, according to one embodiment of the present invention.

FIG. 10 illustrates an optimized form of the database table of FIG. 9, according to one embodiment of the present invention.

FIG. 11 illustrates an optimized reference table based on the database table of FIG. 9, according to one embodiment of the present invention.

DETAILED DESCRIPTION

Figure 1A:
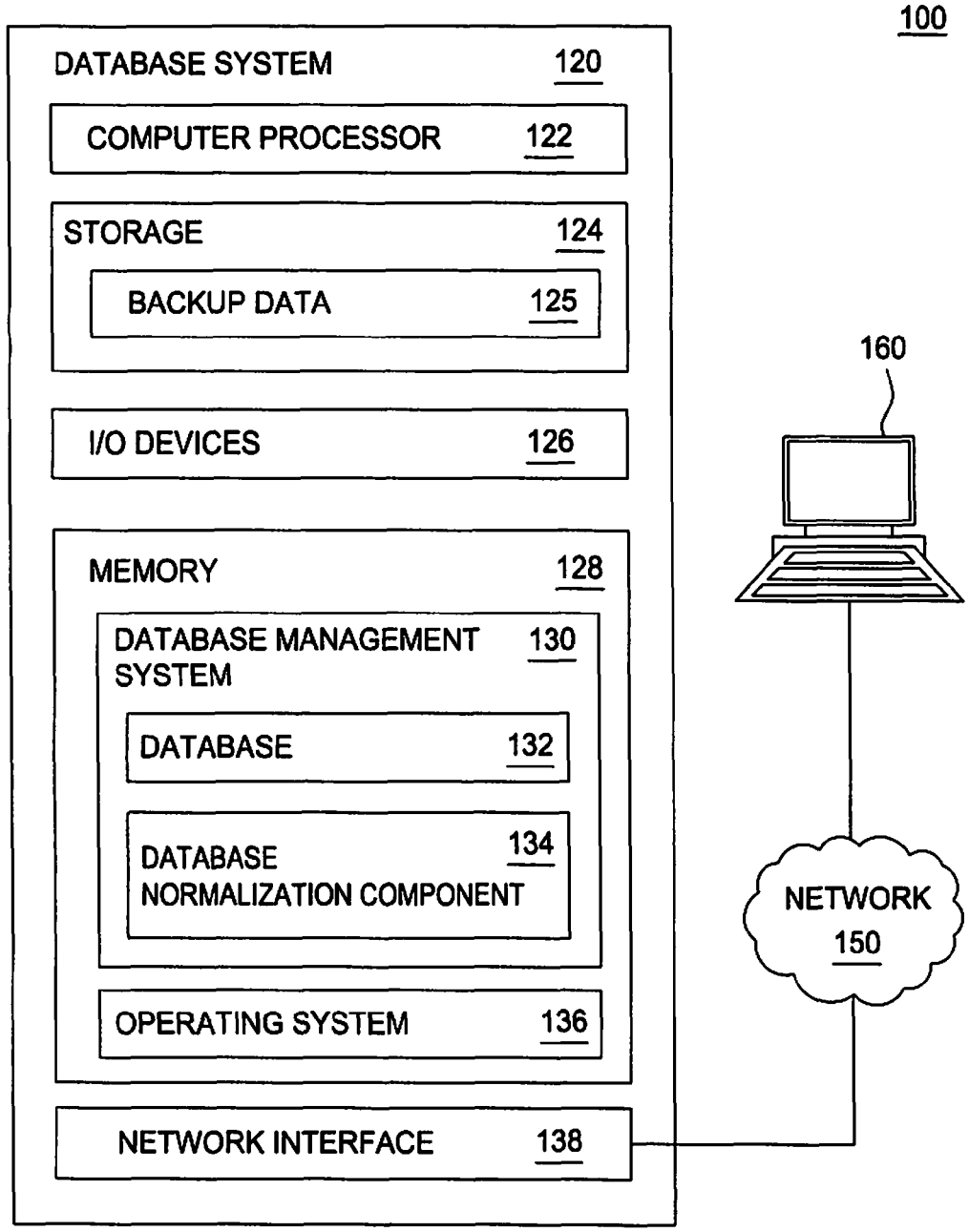
FIGS. 1A-1B are block diagrams illustrating computer systems utilized according to embodiments of the present invention.

Although various tools and techniques exist for defining the original architecture of a database based on an assumed or intended usage of the database, often times fields within such a database are used in ways that were not originally intended. For example, although a database architect may define a field in the database as a "Comments" field, users of the database may instead use the field to indicate the status of an order. Thus, although the database field may be optimized for its originally-intended purpose (i.e., to store a string of comments), the field may not be optimized for use as an order status field. As such, even though the database architect may optimize fields in the database for their intended purpose, the database architect cannot account for the unintended and often unpredictable misuses of the database fields. This may result in a sub-optimal database structure in practice when database fields are used for unintended purposes, even though the database is optimized with respect to the structure as originally intended.

Furthermore, databases are often saved and then restored to a previous state. For example, such a restore operation may be a part of testing on the database (e.g., stress testing before moving a database to a production environment). As a second example, the restore operation may be performed as part of a disaster recovery exercise. Embodiments of the invention may perform normalization operations on a database based on historical database usage data. Such usage data may indicate, without limitation, data values assigned to fields in the database, the data types of the data values, the length of the data values, and so on. Embodiments may further base the normalization operations on metadata describing elements of the database. Examples of such elements include, without limitation, database indexes, materialized query tables, database triggers and database constraints.

Advantageously, embodiments of the invention minimize the downtime of the database by performing normalization operations on the database as part of the database restore, since the database is already taken offline to perform the database restore operation. Additionally, in an embodiment using an abstract data model, embodiments may update the abstract data model based on any changes made to the database as part of the normalization process. By doing this, embodiments may normalize the database to optimize subsequent database operations issued against the database, while allowing queries issued against the database to remain unchanged.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., a DBMS 130) or related data available in the cloud. For example, the DBMS 130 could execute on a computing system in the cloud and process queries to access the database 132 received from users and applications in the cloud. In such a case, the database normalization component 134 could monitor the actions of the DBMS 130 to collect usage data and store the collected usage data at a storage location in the cloud. The database normalization component 134 may then, as part of a database restore, normalize the database 132 to optimize future database operations, based on the collected usage data. Doing so allows a user to efficiently access information in the database 132 from any computing system attached to a network connected to the cloud (e.g., the Internet).

Referring now to FIG. 1A, FIG. 1A is a block diagram illustrating a computer system configured to run a database normalization component, according to one embodiment of the present invention. As shown, the database system 120 includes, without limitation, a central processing unit (CPU) 122, system storage 124, I/O devices 126, a memory 128, and a network interface card 138. I/O devices 126 may represent a variety of input and output devices, including keyboards, mice, visual displays, printers and so on. The database system 120 may connect to a network 150 (e.g., the Internet) using the network interface 138.

The CPU 122 generally retrieves and executes programming instructions stored in the memory 128. Similarly, the CPU 122 stores and retrieves application data residing in the memory 128. An interconnect (not shown) may be used to transmit programming instructions and application data between the CPU 122, storage 124, I/O devices 126, network interface 138, and memory 128. CPU 122 is included to be representative of a single CPU, multiple CPUs, a single CPU having multiple processing cores, and the like. Furthermore, CPU 122 may be any processor capable of performing the functions described herein. Although memory 128 is shown as a single entity, memory 128 may include one or more memory devices having blocks of memory associated with physical addresses, such as random access memory (RAM), read only memory (ROM), flash memory or other types of volatile and/or non-volatile memory. Storage 124, such as a hard disk drive, solid state device (SSD), or flash memory storage drive, may store non-volatile data. As shown, storage 124 contains backup data 125. Generally, the backup data 125 represents a set of data that may be used to restore the database 132 to a previous state. Furthermore, as will be understood by one of ordinary skill in the art, any computer system capable of performing the functions described herein may be used.

In the pictured embodiment, memory 128 contains a database management system 130 (hereinafter "DBMS") and an operating system 136. The DBMS 130, in turn, contains a database 132 and a database normalization component 134. Generally, the operating system 136 may be any operating system capable of performing the functions described herein.

Furthermore, although various elements are shown as residing in memory 128 on the database system 120, such a depiction is without limitation. Of course, one of ordinary skill in the art will recognize that elements such as, for instance, the database 132, may reside in memory 128 as shown, in storage 124, or on another computer system entirely, and that the depiction shown in FIG. 1A is for illustrative purposes only.

Generally, the database normalization component 134 may monitor the actions of the DBMS 130 with regard to the database 132. For example, the database normalization component 134 may monitor queries received by the DBMS 130 that request data from the database 132. Additionally, the database normalization component 134 may also monitor actions taken by the DBMS 130 in response to these queries. For example, the database normalization component 134 may monitor execution plans generated by the DBMS 130 in response to received queries.

The database normalization component 134 may collect usage data as a result of monitoring the actions of the DBMS 130. For instance, the database normalization component 134 may collect, without limitation, usage data on data values that are assigned to particular database fields, the data types of the data values, how often particular data values occur in the database fields, and so on. The database normalization component 134 may then use the collected usage data in database normalization operations.

The database normalization component 134 may continue to monitor DBMS 130 activities until a database restore request is received. A database restore, as used herein, refers to populating a database with data corresponding to a previous state of the database. For example, a first state of the database 132 may be persisted by collecting and storing data relating to the current state of the database 132 as backup data 125. If at a subsequent time the database administrators wish to revert the database 132 back to the first state, the database administrators may perform a database restore using the backup data 125.

As part of the restore operation, the database normalization component 134 may normalize the restored database to optimize database operations performed on the database. The database normalization component 134 may normalize the database 132 based on the collected usage data. Thus, for example, if a particular column in the database 132 is of the Decimal data type, but the data values assigned to the column are consistently Integer values, the database normalization component 134 may determine that the database may be optimized by converting the column to the Integer data type. That is, because the Integer data type takes less storage space than the Decimal data type, the database normalization component 134 may optimize the database 132 by reducing the size of the database 132, without impacting the content contained in the database 132. In one embodiment, the database normalization component 134 further generates a report including a list of database changes that were made as part of the database normalization process.

As a second example, the database normalization component 134 may determine, using the collected usage data, that a particular comment field with the data type VARCHAR(50) in the database always contains one of a fixed set of data values. This may be the case when a particular database field was originally intended for a first purpose (e.g., a field for database users to store comments), but in practice was used for a different or more specific purpose. For example, the collected usage data may indicate that a comment field in the database 132 consistently contains either the value "VALID" or "INVALID". In such an example, the database normalization component 134 may determine that the database 132 may be optimized, as part of a database restore, to represent the values in the column with the values "0" and "1" to represent the strings "VALID" and "INVALID", respectively. In one embodiment, the database normalization component 134 may then create a new reference table, mapping the value of "0" to the string "VALID" and "1" to the string "INVALID". In another embodiment, the database normalization component 134 may create a new column in the database table, mapping the value of "0" to the string "VALID" and "1" to the string "INVALID". By doing this, the database normalization component 134 may optimize the database 132 by reducing the size of the comments field in the exemplary database table from the data type VARCHAR(50) to a CHAR(1) data type. Of course, such an example is for illustrative purposes and is without limitation, and one of ordinary skill in the art will quickly recognize that other database normalization operations, such as merging two or more database tables, may be performed as well.

In one embodiment, the database normalization component 134 further bases the database normalization on metadata describing the database 132. For instance, such metadata may include, without limitation, database index metadata, materialized query table (hereinafter "MQT") metadata, database trigger metadata, and database constraint metadata. The database normalization component 134 may use such metadata in determining whether and how a particular database construct should be optimized. As an example, although the collected usage data may indicate that two database tables should be merged into a single table, if one of the tables is associated with a database trigger, the database normalization component 134 may determine that the tables should not be merged, because such a merger would result in increased database trigger activity.

Advantageously, embodiments of the invention enable the optimization of existing databases based not only on the data in the database and relationships between data in the database, but on collected usage data reflecting how the database is being used. Thus, although two instances of a database may be organized with the same database structure, if the two instances of the database being used in different ways, embodiments of the invention may normalize each instance of the database differently. As a result, embodiments may better optimize the database by customizing the database normalization based on the use of the database. Additionally, by performing database normalization operations as part of a database restore, embodiments of the invention minimize any downtime for the database.

As will be apparent to one of ordinary skill in the art, certain database normalization operations may affect how data in the database 132 is queried. For example, if the database normalization component 134 normalizes the database 132 by splitting a particular database table into two or more new database tables, queries issued against the database 132 may need to be updated in order to reflect the new database structure. As discussed above, the database normalization component 134 may generate a report containing a list of database changes made as part of database normalization operations. Such a report may be used by database administrators and application developers to update any queries that will be issued against the database 132.

In one embodiment, a data abstraction model may be provided for the database 132. Embodiments of the invention that use a data abstraction model allow for database queries to be written in the form of abstract queries composed using one or more logical fields. In such an embodiment, when the database normalization component 134 normalizes the database 132 as part of a database restore, the database normalization component 134 may further update the data abstraction model to account for the changes to the database 132. Accordingly, by updating the data abstraction model, the abstract queries may remain the same, even though the underlying structure of the database 132 has changed. Such an embodiment is further defined in the discussion of FIGS. 1B-5 below.

An Exemplary Query Execution Runtime Environment

Figure 1B:
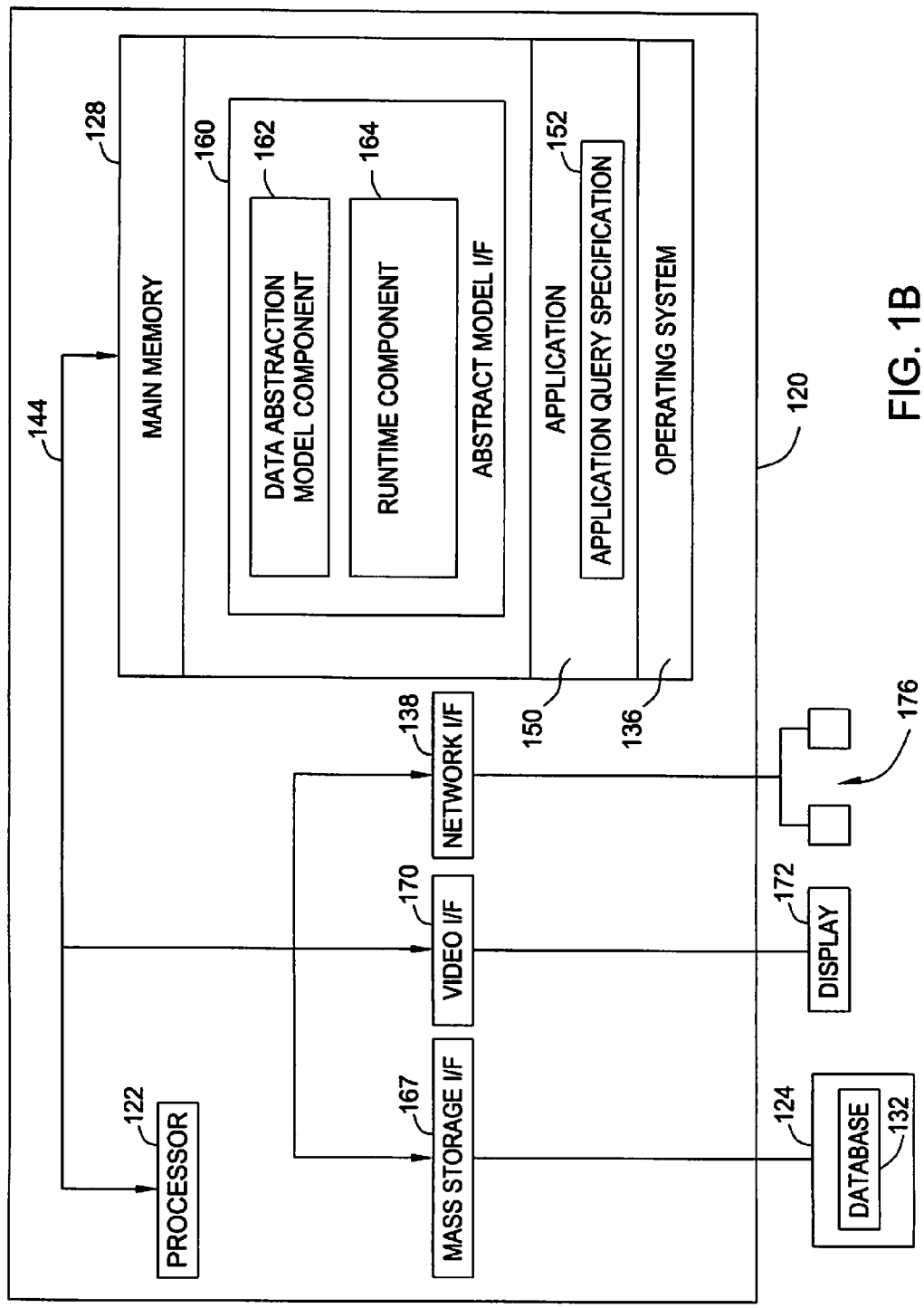

Referring now to FIG. 1B, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1B is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110.

Examples of the operating system 118 include IBM OS/400®, UNIX, Microsoft Windows®, and the like.

The memory 116 further includes one or more applications 120 and an abstract model interface 130. The applications 120 and the abstract model interface 130 are software products comprising a plurality of instructions that are resident at various times in various memory and storage devices in the computer system 110. When read and executed by one or more processors 112 in the computer system 110, the applications 120 and the abstract model interface 130 cause the computer system 110 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation of the data. A physical representation of data defines an organizational schema of the data. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract model interface 130. A logical field defines an abstract view of data whether as an individual data item or a data structure in the form of, for example, a database table. In particular, the logical fields used in the abstract queries are defined by a data abstraction model component 132 of the abstract model interface 130.

The runtime component 134 transforms the abstract queries into concrete queries having a form consistent with the physical representation of the data contained in the database 139. The concrete queries can be executed by the runtime component 134 against the database 139. Operation of the runtime component 134 is further described below with reference to FIG. 2.

Advantageously, by using a data abstraction model such as described in FIG. 1B, embodiments of the invention may perform database normalization operations on a database as part of a database restore, without having to modify the queries being issued against the database. Rather, in such an embodiment, embodiments may perform normalization on the database based on historical database usage data, and then update the data abstraction model to account for any modifications made to the database structure. For example, if the database normalization component 134 combines two or more database tables as part of database normalization operations, the database normalization component 134 may then update the data abstraction model accordingly. By doing this, the database normalization component 134 may perform all database normalization automatically, without necessitating database administrators and application developers to update any queries being issued against the database to account for the updated database structure.

Figure 2:
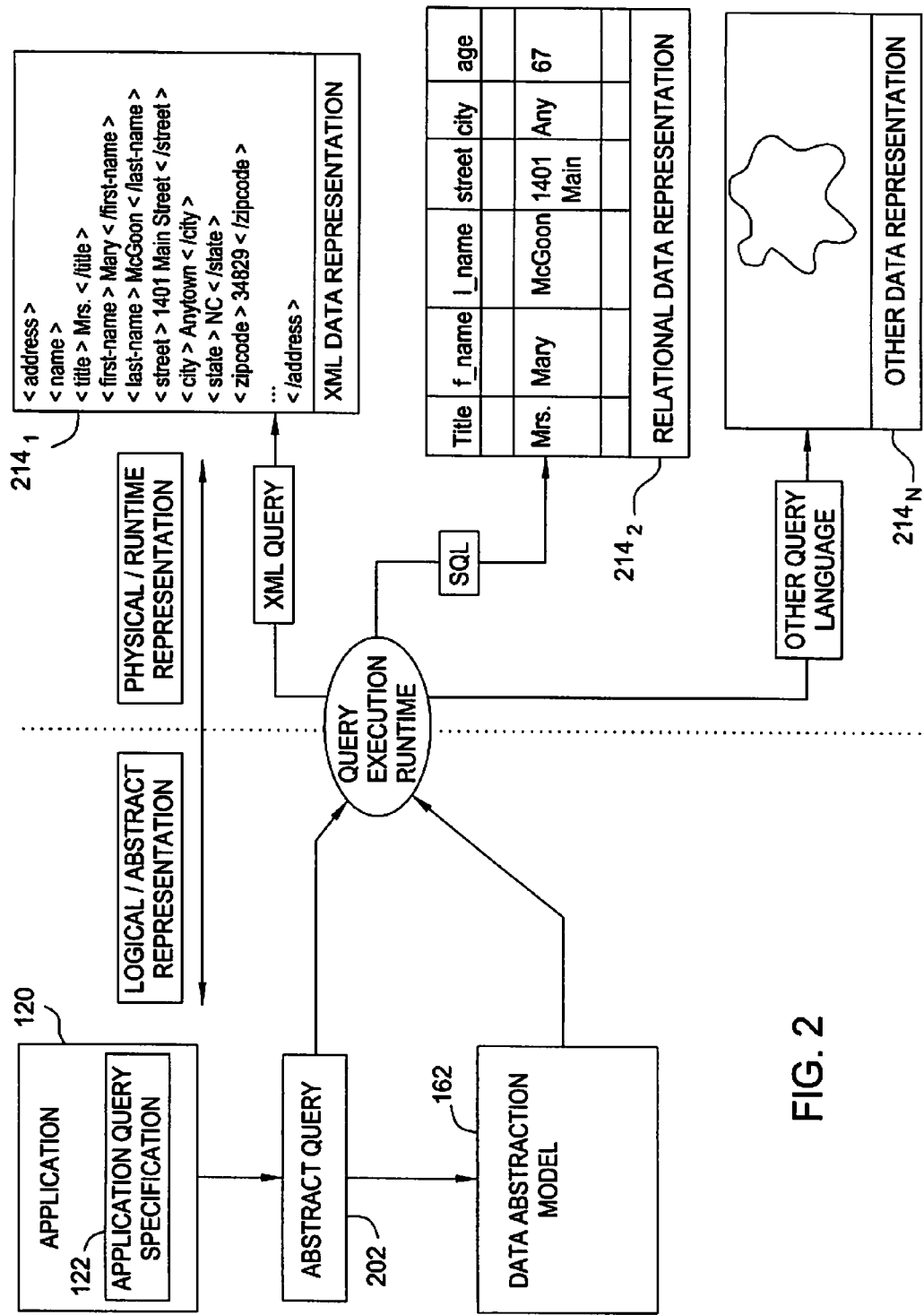
FIGS. 2-3 are relational views of software components for abstract query management, according to embodiments of the present invention.
Figure 3:
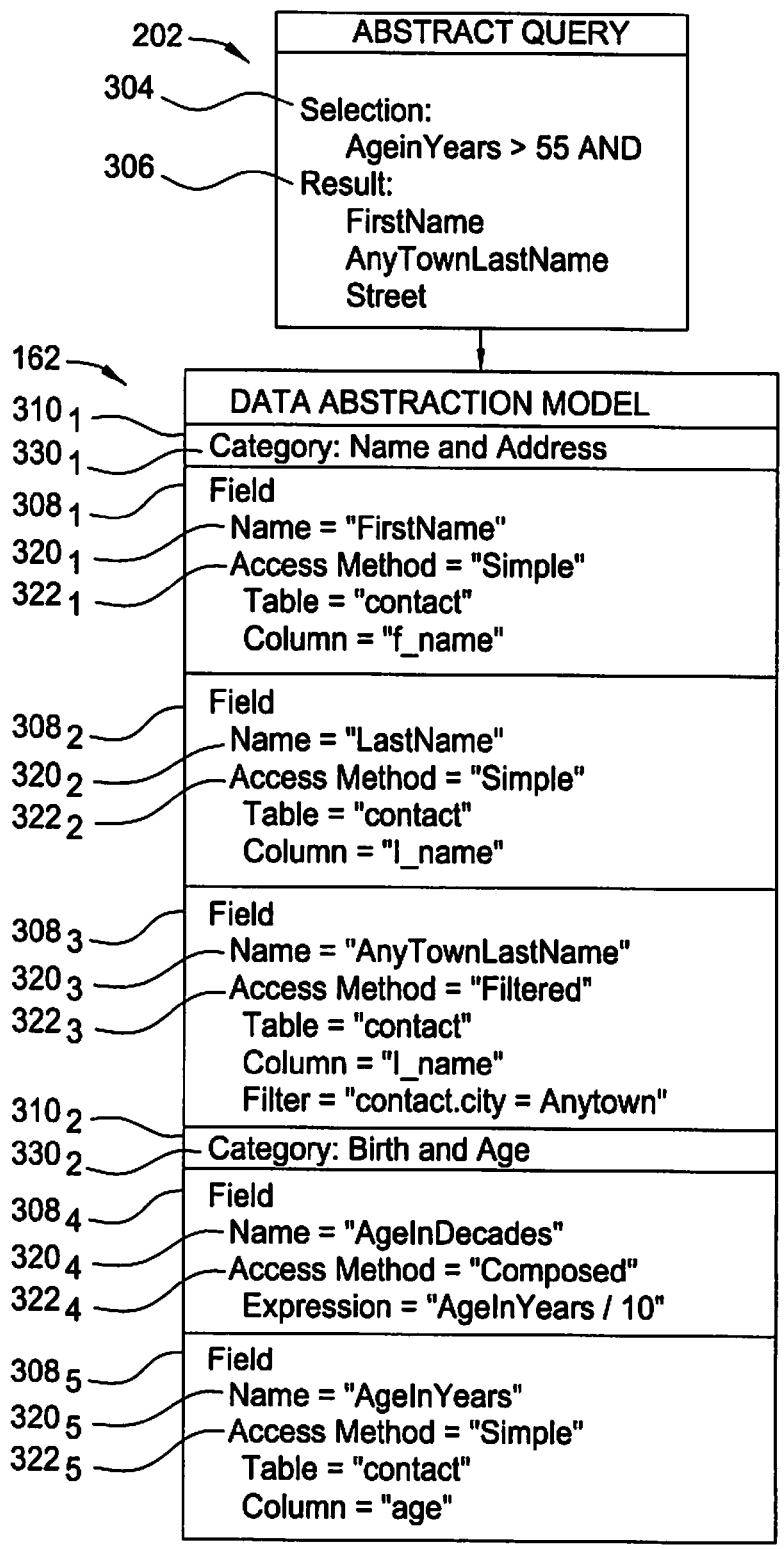

Referring now to FIG. 2, a relational view illustrating interaction of the runtime component 164, the application 150, and the data abstraction model 162 at query execution runtime is shown. The data abstraction model 162 is also referred to herein as a "logical representation" because the data abstraction model 162 defines logical fields corresponding to data structures in a database (e.g., database 132), thereby providing an abstract, i.e., a logical view of the data in the database. A data structure is a physical arrangement of the data, such as an arrangement in the form of a database table or a column of the database table. In a relational database environment having a multiplicity of database tables, a specific logical representation having specific logical fields can be provided for each database table. In this case, all specific logical representations together constitute the data abstraction model 162. Physical entities of the data are arranged in the database 132 according to a physical representation of the data. A physical entity of data (interchangeably referred to as a physical data entity) is a data item in an underlying physical representation. Accordingly, a physical data entity is the data included in a database table or in a column of the database table, i.e., the data itself. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model 162 is provided for each separate physical representation 214, as explained above for the case of a relational database environment. In an alternative embodiment, a single data abstraction model 162 contains field specifications (with associated access methods) for two or more physical representations 214. A field specification is a description of a logical field and generally comprises a mapping rule that maps the logical field to a data structure(s) of a particular physical representation.

Using a logical representation of the data, the application query specification 152 specifies one or more logical fields to compose a resulting query. A requesting entity (e.g., the application 150) issues the resulting query 202 as defined by an application query specification of the requesting entity. In one embodiment, the abstract query 202 may include both criteria used for data selection and an explicit specification of result fields to be returned based on the data selection criteria. An example of the selection criteria and the result field specification of the abstract query 202 are shown in FIG. 3A. Accordingly, the abstract query 202 illustratively includes selection criteria 304 and a result field specification 306.

The resulting query 202 is generally referred to herein as an "abstract query" because the query is composed according to abstract (i.e., logical) fields rather than by direct reference to the underlying data structures in the database 132. As a result, abstract queries may be defined that are independent of the particular underlying physical data representation used. For execution, the abstract query is transformed into a concrete query consistent with the underlying physical representation of the data using the data abstraction model 162. The concrete query is executable against the database 132. An exemplary method for transforming the abstract query into a concrete query is described below with reference to FIGS. 4-5.

In general, the data abstraction model 162 exposes information as a set of logical fields that may be used within an abstract query to specify criteria for data selection and specify the form of result data returned from a query operation. The logical fields are defined independently of the underlying physical representation being used in the database 132, thereby allowing abstract queries to be formed that are loosely coupled to the underlying physical representation.

An Exemplary Data Abstraction Model

Referring now to FIG. 3A, a relational view illustrating interaction of the abstract query 202 and the data abstraction model 132 is shown. In one embodiment, the data abstraction model 132 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple." Furthermore, each attribute may include one or more associated abstract properties. Each abstract property describes a characteristic of a data structure and has an associated value. As indicated above, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column." Furthermore, data location metadata "Table" has the value "contact" and data location metadata "Column" has the value "f_name." Accordingly, assuming an underlying relational database schema in the present example, the values of data location metadata "Table" and "Column" point to a table "contact" having a column "f_name."

In one embodiment, groups (i.e., two or more) of logical fields may be part of categories. Accordingly, the data abstraction model 132 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 139 of FIG. 1B). Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular data structure in the underlying physical representation (e.g., a field mapped to a given database table and column). By way of illustration, as described above, the simple field access method $322_1$ maps the logical field name $320_1$ ("FirstName") to a column named "f_name" in a table named "contact." The field specification $308_3$ exemplifies a filtered field access method $322_3$. Filtered fields identify an associated data structure and provide filters used to define a particular subset of items within the physical representation. An example is provided in FIG. 3A in which the filtered field access method $322_3$ maps the logical field name $320_3$ ("AnyTownLast-Name") to data in a column named "l_name" in a table named "contact" and defines a filter for individuals in the city of "Anytown." Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more data structures using an expression supplied as part of the access method definition. In this way, information which does not exist in the underlying physical data representation may be computed. In the example illustrated in FIG. 3A the composed field access method $322_4$ maps the logical field name $320_4$ "AgeInDecades" to "AgeInYears/10." Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3A are representative of logical fields mapped to data represented in the relational data representation $214_2$ shown in FIG. 2. However, other instances of the data abstraction model 132 map logical fields to other physical representations, such as XML.

An illustrative abstract query corresponding to the abstract query 202 shown in FIG. 3A is shown in Table I below. By way of illustration, the illustrative abstract query is defined using XML. However, any other language may be used to advantage.

TABLE I

ABSTRACT QUERY EXAMPLE

```
<?xml version="1.0"?>
<!--Query string representation: (AgeInYears > "55"-->
<QueryAbstraction>
  <Selection>
    <Condition internalID="4">
    <Condition field="AgeInYears" operator="GT" value="55"
      internalID="1"/>
  </Selection>
  <Results>
    <Field name="FirstName"/>
    <Field name="AnyTownLastName"/>
  </Results>
</QueryAbstraction>
```

Illustratively, the abstract query shown in Table I includes a selection specification (lines 004-008) containing selection criteria and a result specification (lines 009-012). In one embodiment, a selection criterion consists of a field name (for a logical field), a comparison operator (=, >, <, etc.) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3A is shown in Table II below. By way of illustration, the illustrative data abstraction model is defined using XML. However, any other language may be used to advantage.

TABLE II

DATA ABSTRACTION MODEL EXAMPLE

```
<?xml version="1.0"?>
<DataAbstraction>
    <Category name="Name and Address">
        <Field queryable="Yes" name="FirstName" displayable="Yes">
            <AccessMethod>
                <Simple columnName="f_name" tableName="contact"></Simple>
            </AccessMethod>
        </Field>
        <Field queryable="Yes" name="LastName" displayable="Yes">
            <AccessMethod>
                <Simple columnName="l_name" tableName="contact"></Simple>
            </AccessMethod>
        </Field>
        <Field queryable="Yes" name="AnyTownLastName" displayable="Yes">
            <AccessMethod>
                <Filter columnName="l_name" tableName="contact">
                </Filter="contact.city=Anytown">
            </AccessMethod>
        </Field>
    </Category>
    <Category name="Birth and Age">
        <Field queryable="Yes" name="AgeInDecades" displayable="Yes">
            <AccessMethod>
                <Composed columnName="age" tableName="contact">
                </Composed Expression="columnName/10">
            </AccessMethod>
        </Field>
        <Field queryable="Yes" name="AgeInYears" displayable="Yes">
            <AccessMethod>
                <Simple columnName="age" tableName="contact"></Simple>
            </AccessMethod>
        </Field>
    </Category>
</DataAbstraction>
```

By way of example, note that lines 004-008 correspond to the first field specification $308_1$ of the DAM 132 shown in FIG. 3A and lines 009-013 correspond to the second field specification $308_2$.

Transforming an Abstract Query into a Concrete Query

Figure 4:
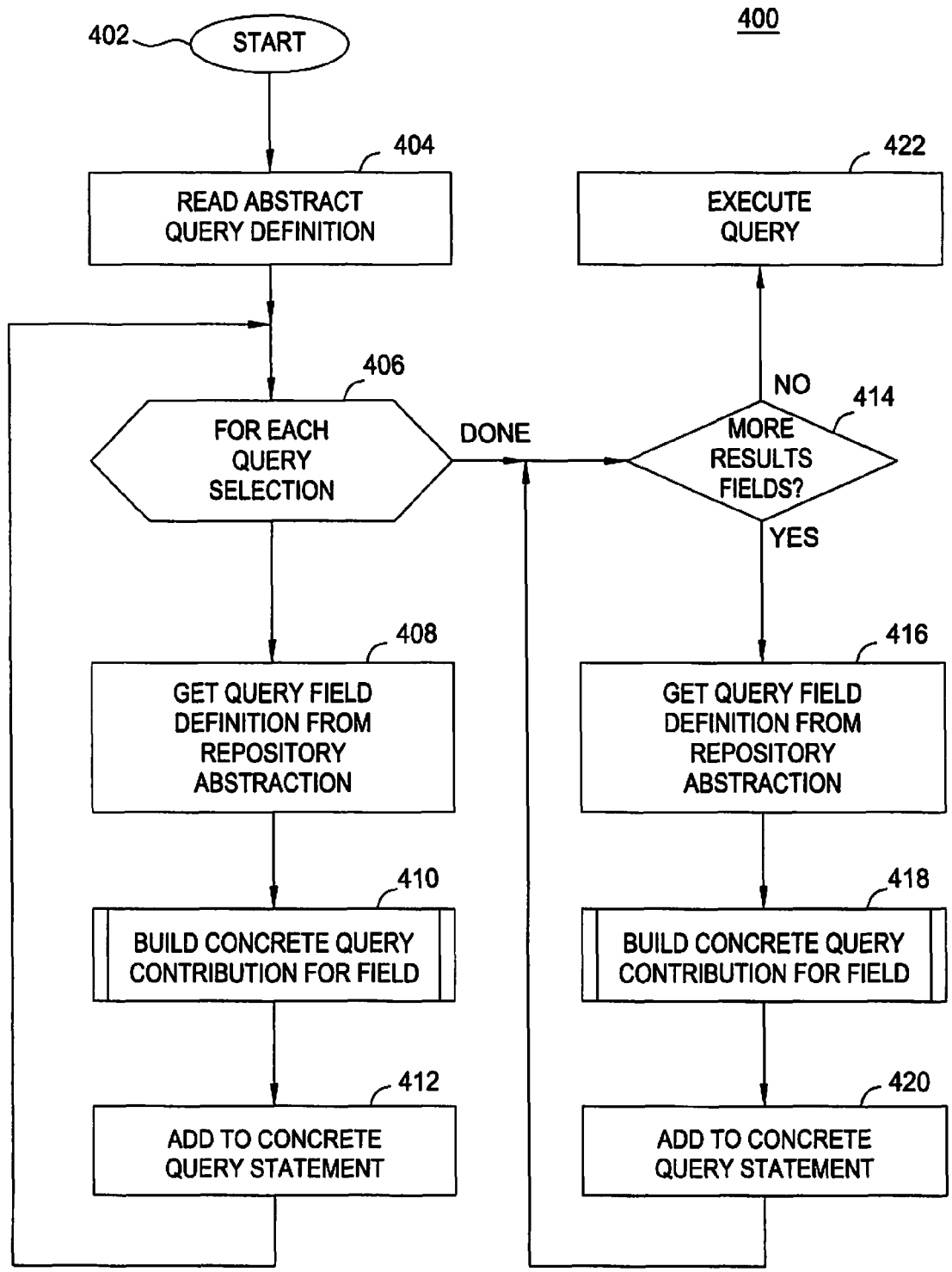
FIGS. 4-5 are flow charts illustrating the operation of a runtime component, according to embodiments of the present invention.

Referring now to FIG. 4, an illustrative runtime method 400 exemplifying one embodiment of the operation of the runtime component 134 of FIG. 1B is shown. The method 400 is entered at step 402 when the runtime component 134 receives as input an abstract query (such as the abstract query shown in Table I or IV). At step 404, the runtime component 134 reads and parses the abstract query and locates individual selection criteria and desired result fields. At step 406, the runtime component 134 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc.) and a value expression (what is the field being compared to). At step 408, the runtime component 134 uses the field name from a selection criterion of the abstract query to look up the definition of the field in the data abstraction model 132. As noted above, the field definition includes a definition of the access method used to access the data structure associated with the field. The runtime component 134 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1B. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 134 looks up a result field name (from the result specification of the abstract query) in the data abstraction model 132 and then retrieves a result field definition from the data abstraction model 132 to identify the physical location of data to be returned for the current logical result field. The runtime component 134 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
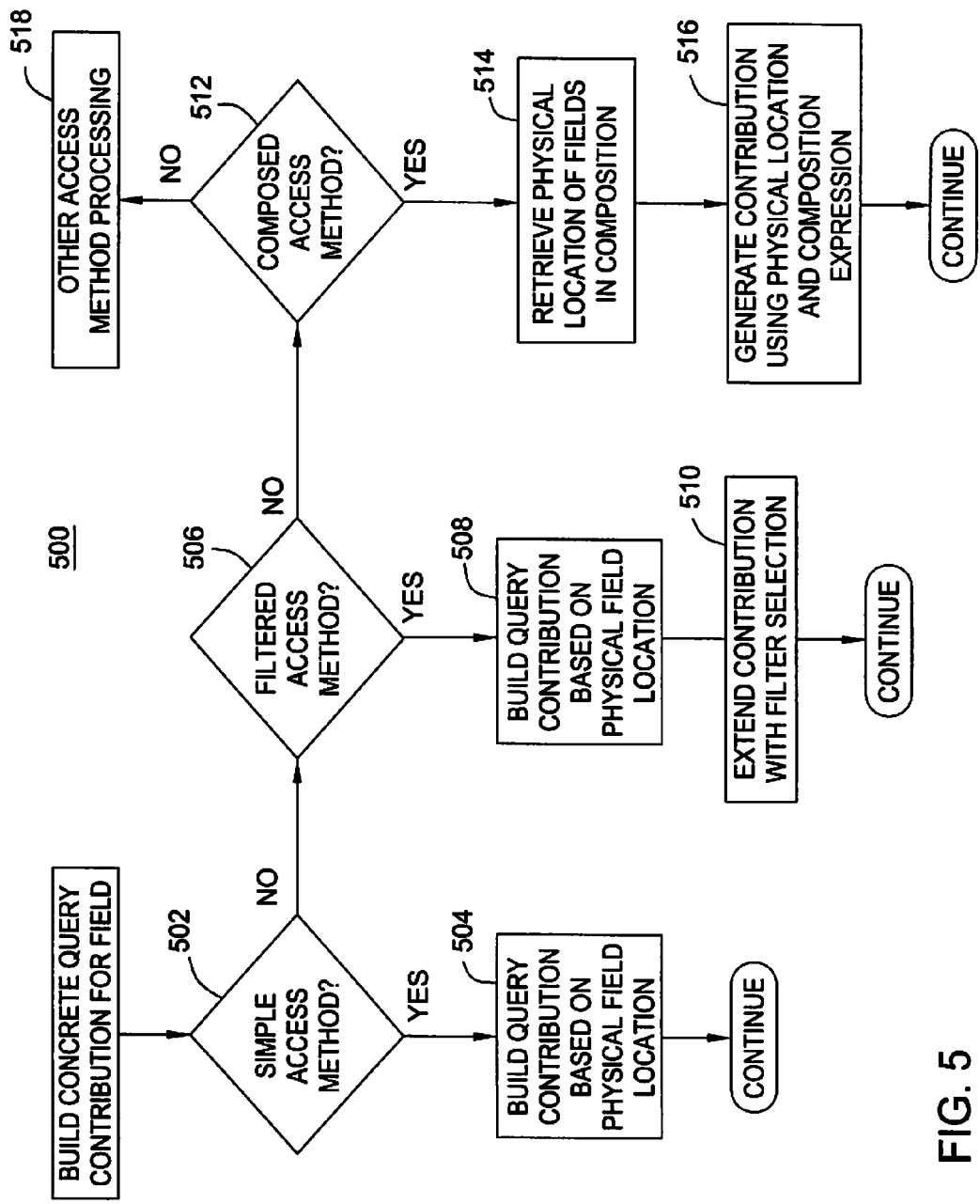

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Figure 6:
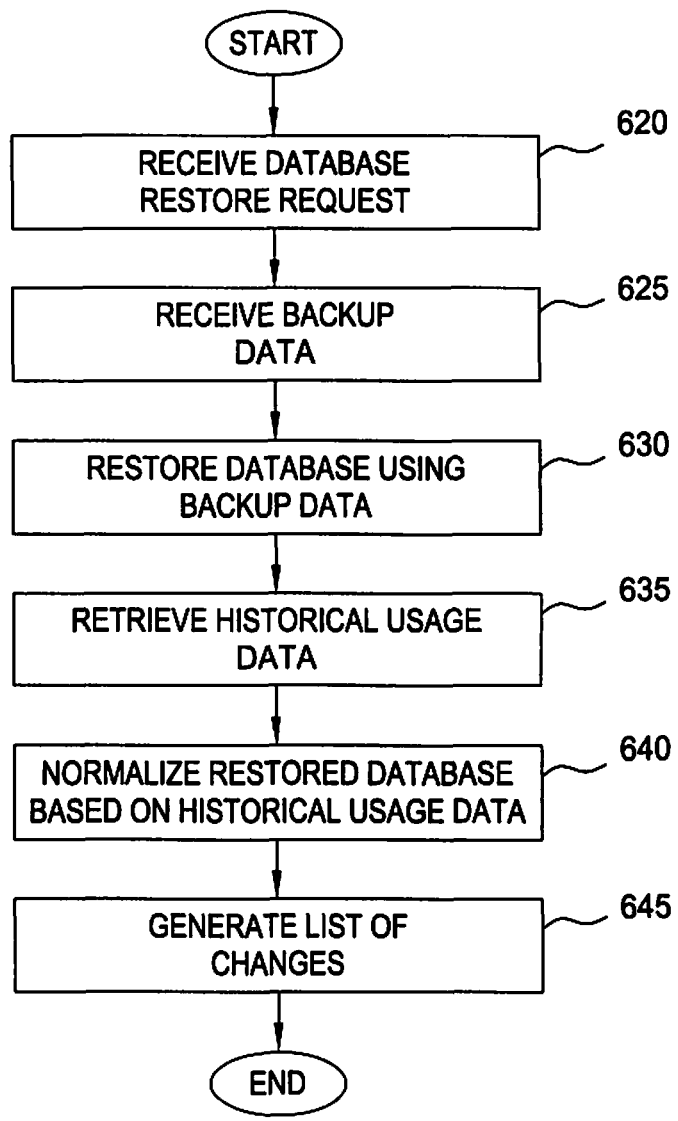
FIG. 6 is a flow chart illustrating a method for normalizing a database as part of a database restore, according to one embodiment of the present invention.

FIG. 6 is a flow chart illustrating a method for normalizing a database as part of a database restore, according to one embodiment of the present invention. As shown, the method 600 begins at step 620, where the DBMS 130 receives a database restore request. Generally, the database restore request specifies at least a previous state of the database to restore the database to. For example, a restore point for a database may be created, preserving the state of the database on Nov. 8, 2010 at 5:00 pm. Such a restore point may then be stored as a set of backup data, which may later be used to restore the database back to the state it was in at 5:00 pm on Nov. 8, 2010. Such a previous state may reflect not only the structure of the database at a previous moment in time, but also the data contained in the database at the previous moment in time. Upon receiving the database restore request, the DBMS 130 retrieves backup data associated with the specified previous state of the database (step 625).

Once the backup data is retrieved, the DBMS 130 restores the database using the backup data (step 630). Once the database is restored, the database normalization component 134 retrieves historical usage data associated with the database (step 635). In one embodiment, the database normalization component 134 may have previously collected the historical usage data prior to the restore operation by monitoring the actions of the database and monitoring requests incoming to the database.

Once the historical usage data is retrieved, the database normalization component 134 normalizes the restored database based on the historical usage data (step 640). As discussed above, the normalization operation may include combining two or more database tables into a single database table, or may include splitting a single database table into two or more data base tables. Additionally, the normalization may further include converting one or more database fields from a first data type to a second data type. Furthermore, the normalization may include reducing the length of a data field in the database.

In one embodiment, the database normalization component 134 further bases the database normalization on metadata describing the database 132. In such an embodiment, the metadata may include, without limitation, database index metadata, materialized query table (hereinafter "MQT") metadata, database trigger metadata, and database constraint metadata. The database normalization component 134 may use such metadata in determining whether and how a particular database construct should be optimized. For instance, if the historical usage data indicates that two database tables should be merged into a single table, and if one of the tables is associated with several database triggers, the database normalization component 134 may determine that the tables should not be merged, since such a merger would result in increased database trigger activity for the database.

As a second example, if the historical usage data indicates that two database tables should be merged into a single table, and if one of the tables is associated with particular database constraints, the database normalization component 134 may determine that the tables should not be merged, since all updates to the merged table would require checking the constraints, whereas previously accesses to only one of the tables required constraint checking. Thus, the database normalization component 134 may determine that, at least for the purposes of this example, that the increased constraint checking activity would outweigh the benefits of merging the two tables. Of course, these examples are without limitation and for illustrative purposes only, and more generally any number of other situations and different outcomes consistent with the functions described herein are broadly contemplated.

Once the restored database is normalized, the database normalization component 134 generates a list of changes made to the database (step 645). Such a list may then be used by database administrators and application developers to update any queries affected by the changes. For example, if the database normalization component 134 combined two database tables into a single database table as part of the normalization operation, queries (e.g., as part of a software application) that previously referenced either of the two database tables may need to be updated in order to reflect the new structure of the database. As discussed above, in an embodiment using a data abstraction model, the database normalization component 134 may automatically update the data abstraction model as part of the normalization process. In such an embodiment, no queries may need to be modified, since the abstract queries are resolved using the updated data abstraction model.

Figure 7:
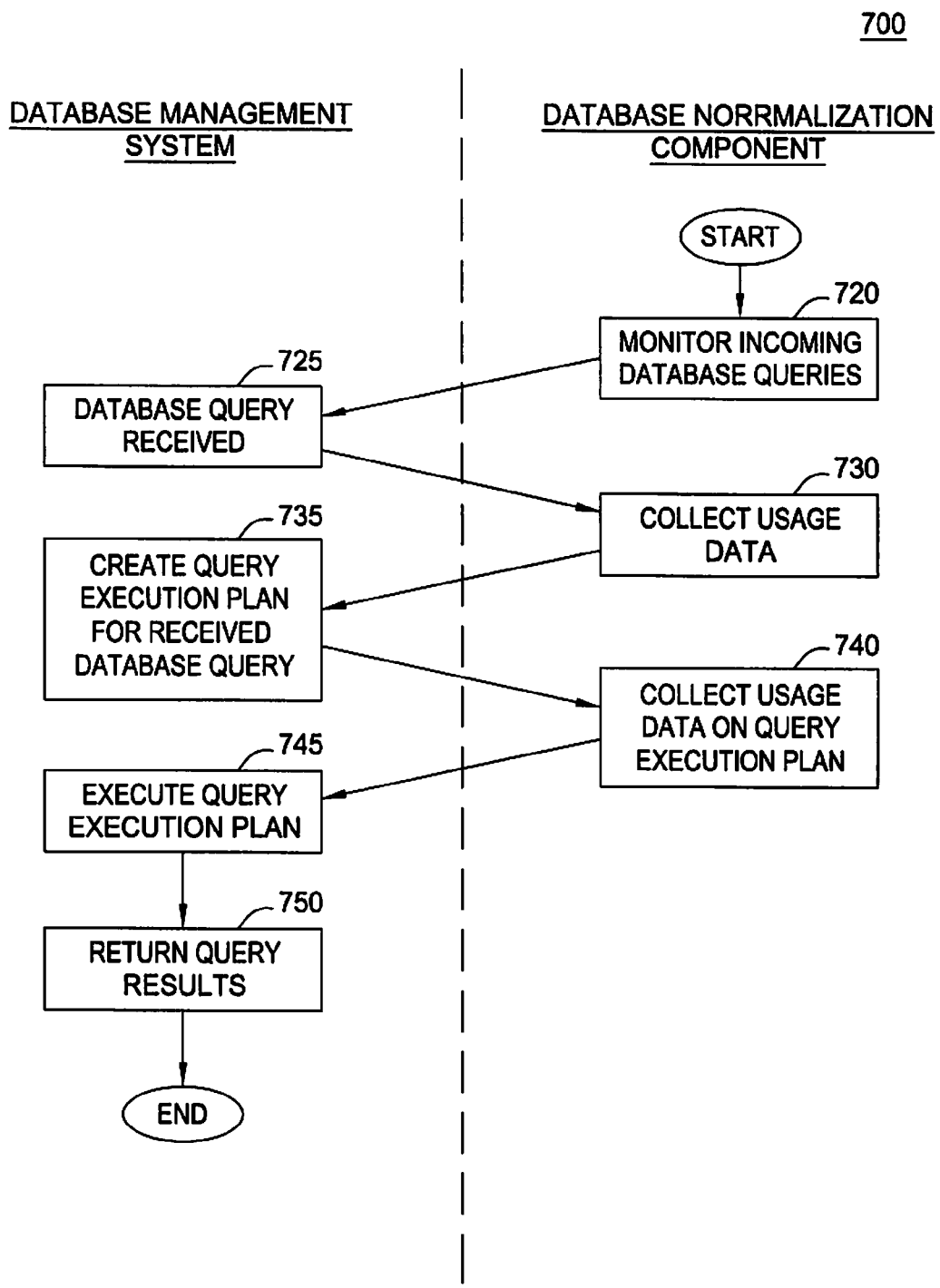
FIG. 7 is a flow chart illustrating a method for collecting database usage data, according to one embodiment of the present invention.

FIG. 7 is a flow chart illustrating a method for collecting database usage data, according to one embodiment of the present invention. As shown, the method 700 begins at step 720, where the database normalization component 134 monitors incoming database queries. At some later point in time, the DBMS 130 receives a database query from a requesting entity (step 725). Responsive to the DBMS 130 receiving the query, the database normalization component 134 collects database usage data based on the received query. For example, the database normalization component 134 may collect usage data based on what database fields are included in the query.

The DBMS 130 then creates a query execution plan for the received database query (step 735). Generally, the query execution plan may include one or more database operations that the DBMS 130 will perform to execute the query. Responsive to the DBMS 130 creating the query execution plan, the database normalization component 134 collects usage data on the created query execution plan (step 740). For example, the database normalization component 134 may collect data such as what tables are joined as part of the execution plan. Such data may be useful, for instance, in enabling the database normalization component 134 to determine whether two tables are consistently joined together when processing database queries. Continuing the example, if the database normalization component 134 determines that two tables are often times joined together, the database normalization component 134 may consequently determine that the two tables should be merged as part of a normalization operation. Of course, such an example is for illustrative purposes only and is without limitation, and one of ordinary skill in the art will quickly recognize that other types of data may be collected and used for this and other database normalization purposes.

The DBMS 130 then executes the created query execution plan against the database in order to process the query (step 745). Once the execution of the query execution plan is complete, the DBMS 130 returns any query results produced by executing the query execution plan to the requesting entity (step 750), and the method 700 ends.

Figure 8:
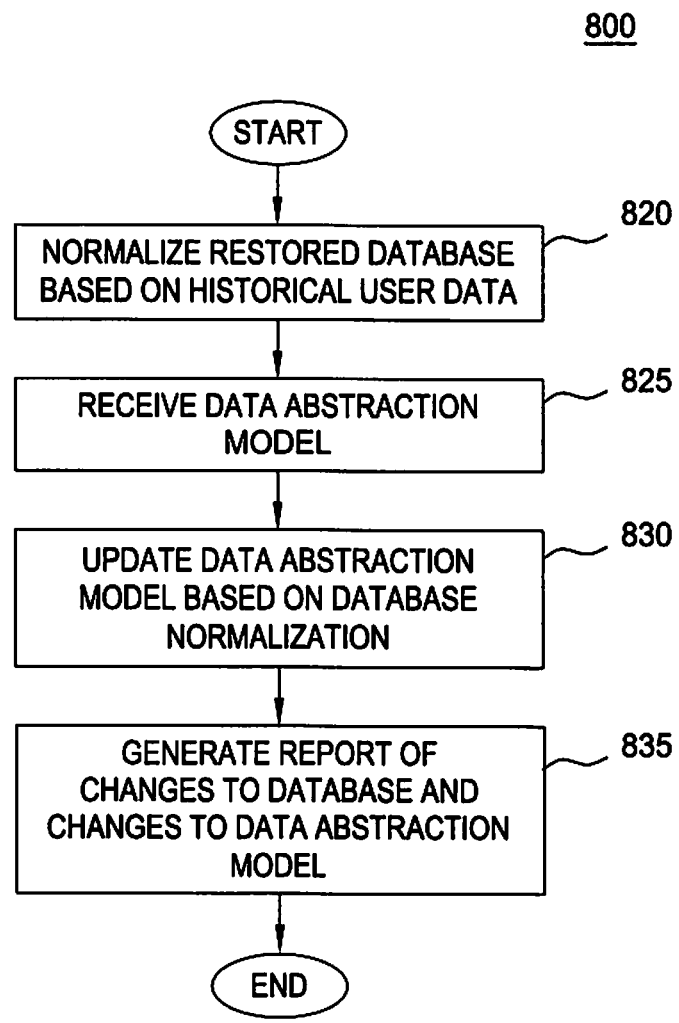
FIG. 8 is a flow chart illustrating a method for normalizing a database as part of a database restore, according to one embodiment of the present invention.

FIG. 8 is a flow chart illustrating a method for normalizing a database as part of a database restore, according to one embodiment of the present invention. As shown, the method 800 begins at step 820, where the database normalization component 134 normalizes a restored database based on historical database usage data. Such a normalization operation may occur, for instance, after the step 635 of FIG. 6. Once the database is normalized based on the historical database usage data, the database normalization component 134 retrieves a data abstraction model associated with the database (step 825).

The database normalization component 134 then updates the data abstraction model, based on the normalization operations performed on the database (step 830). Once the data abstraction model is updated, the database normalization component 134 generates a report including any changes made to the database and any changes made to the data abstraction model as part of the normalization process (step 835). Once the report is generated, the method 800 ends.

FIG. 9 illustrates an unoptimized database table, according to one embodiment of the present invention. For purposes of the example shown in FIGS. 9-11, assume that the depicted tables represent an order history table in a database for storing order information for an exemplary business. As shown, the table 900 contains three columns: "Order Number," "Total Price" and "Comment." Accordingly, the Order Number column reflects the unique ID number assigned to each order and the Total Price column reflects the total price paid for the order. Additionally, the table 900 includes a Comment column. For purposes of this example, assume that the database architect designing the table 900 intended to the Comment column to include any comments or special instructions the sales staff of the exemplary business, and thus assigned the Comment column a data type of VARCHAR(50). However, in this example, despite the original intentions of the database architect, the sales staff has used the Comment column to reflect the current status of the order. Thus, as shown, the Comment column contains either the value of "PENDING", "COMPLETE" or "CANCELLED".

FIG. 10 illustrates an optimized form of the database table of FIG. 9, according to one embodiment of the present invention. As shown, the table 1000 contains identical data to the table 900 in the Order Number column and the Total Price column. However, as part of database normalization operations, the database normalization component 134 has replaced the values in the Comment column with a value of "1," "2" or "3." That is, based on the usage of the database table, the database normalization component 134 has determined that only a fixed set of data values are being inserted into the table. As a result, the database normalization component 134 has converted the Comment column from a VARCHAR(50) to a CHAR(1), thus saving a substantial amount of space in storing the data relating to the column.

Furthermore, in this example, the database normalization component 134 has also created a reference table, in order to preserve the data previously contained in the Comment column. Such a reference table is shown in FIG. 11, which illustrates an optimized reference table based on the database table of FIG. 9, according to one embodiment of the present invention. As shown, the table 1100 maps the values used in the optimized Comment column of table 1000, to their respective strings as originally defined in the table 900. For example, the table 1100 shows that the CommentID of "1" corresponds to the CommentString of "PENDING". As such, the optimized tables 1000 and 1100 may be used in together to represent the original table 900. Such a database optimization is advantageous, as the resulting table shown in FIG. 10 will be substantially smaller, thus saving a substantial amount of space in storing the data relating to the table and reducing the size of the database as a whole.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

The invention claimed is:

1. A computer-implemented method for structurally optimizing a database as part of a database restore, comprising:
  receiving a database restore request to restore the database to a previous state at a particular point in time, the previous state specified in the database restore request; and
  responsive to receiving the database restore request, and by operation of one or more computer processors:
  restoring the database to the previous state using backup data associated with the previous state of the database specified in the database restore request; and
  modifying a structure of one or more database constructs within the restored database to optimize subsequent database operations, based on historical database usage data describing how the database is used and collected based on one or more previous database operations.

2. The computer-implemented method of claim 1, further comprising:
  monitoring one or more database operations performed using the database; and
  collecting the historical database usage data based on the monitored one or more database operations.

3. The computer-implemented method of claim 1, wherein one of the one or more database constructs comprises a database table, and wherein modifying the structure of one or more database constructs within the restored database further comprises:
  splitting the database table in the database into two or more optimized database tables.

4. The computer-implemented method of claim 3, wherein one of the two or more optimized database tables is a reference table.

5. The computer-implemented method of claim 1, wherein the one or more database constructs comprise two or more database tables, and wherein modifying the structure of one or more database constructs within the restored database further comprises:

combining the two or more database tables in the database into a single optimized database table.

6. The computer-implemented method of claim 1, wherein the one or more database constructs comprise a database field, and wherein modifying the structure of one or more database constructs within the restored database further comprises at least one of:
converting the database field in the database from a first data type to a second data type; and
reducing the database field in the database from a first data length to a second data length.

7. The computer-implemented method of claim 1, wherein the historical database usage data includes at least one of (i) data values assigned to one or more database fields, (ii) types of the data values assigned to the database fields, (iii) a length of the data values assigned to the database fields, (iv) a frequency value indicating how often a particular database field is accessed, (v) a redundancy value indicating how often a particular data value is assigned to the database fields.

8. The computer-implemented method of claim 1, wherein modifying the structure of one or more database constructs within the restored database is further based on metadata describing the database, wherein the metadata describes at least one of (i) a database index, (ii) a materialized query table, (iii) a database trigger, and (iv) a database constraint.

9. The computer-implemented method of claim 1, further comprising:
providing a data abstraction model defining one or more logical fields, wherein each logical field maps to at least one database field in the database; and
updating the data abstraction model, based on one or more modifications to the restored database as part of normalizing the restored database.

10. A computer program product for structurally optimizing a database as part of a database restore, comprising:
a non-transitory computer-readable storage medium having computer readable program code embodied therewith, the computer readable program code comprising:
computer readable program code to receive a database restore request to restore the database to a previous state at a particular point in time, the previous state specified in the database restore request; and
computer readable program code to, responsive to receiving the database restore request:
restore the database to the previous state using backup data associated with the previous state of the database specified in the database restore request; and
modify a structure of one or more database constructs within the restored database to optimize subsequent database operations, based on historical database usage data describing how the database is used and collected based on one or more previous database operations.

11. The computer program product of claim 10, further comprising:
computer readable program code to monitor one or more database operations performed using the database; and
computer readable program code to collect the historical database usage data based on the monitored one or more database operations.

12. The computer program product of claim 10, wherein one of the one or more database constructs comprises a database table, and wherein the computer readable program code to modify the structure of one or more database constructs within restored database further comprises:
computer readable program code to split the database table in the database into two or more optimized database tables.

13. The computer program product of claim 12, wherein one of the two or more optimized database tables is a reference table.

14. The computer program product of claim 10, wherein the one or more database constructs comprise two or more database tables, and wherein the computer readable program code to modify the structure of one or more database constructs within the restored database further comprises:
computer readable program code to combine the two or more database tables in the database into a single optimized database table.

15. The computer program product of claim 10, wherein the one or more database constructs comprise a database field, and wherein the computer readable program code to modify the structure of one or more database constructs within the restored database further comprises at least one of:
computer readable program code to convert the database field in the database from a first data type to a second data type; and
computer readable program code to reduce the database field in the database from a first data length to a second data length.

16. The computer program product of claim 10, wherein the historical database usage data includes at least one of (i) data values assigned to one or more database fields, (ii) types of the data values assigned to the database fields, (iii) a length of the data values assigned to the database fields, (iv) a frequency value indicating how often a particular database field is accessed, (v) a redundancy value indicating how often a particular data value is assigned to the database fields.

17. The computer program product of claim 10, wherein the computer readable program code to modify the structure of one or more database constructs within the restored database is further based on metadata describing the database, wherein the metadata describes at least one of (i) a database index, (ii) a materialized query table, (iii) a database trigger, and (iv) a database constraint.

18. The computer program product of claim 10, further comprising:
computer readable program code to provide a data abstraction model defining one or more logical fields, wherein each logical field maps to at least one database field in the database; and
computer readable program code to update the data abstraction model, based on one or more modifications to the restored database as part of normalizing the restored database.

19. A system, comprising:
a computer processor; and
a memory containing a program that, when executed on the computer processor, performs an operation for structurally optimizing a database as part of a database restore, comprising:
receiving a database restore request to restore the database to a previous state at a particular point in time, the previous state specified in the database restore request; and
responsive to receiving the database restore request, and by operation of one or more computer processors:
restoring the database to the previous state using backup data associated with the previous state of the database specified in the database restore request; and
modifying a structure of one or more database constructs within the restored database to optimize subsequent database operations, based on historical database usage data describing how the database is used and collected based on one or more previous database operations.

20. The system of claim 19, the operation further comprising:
   monitoring one or more database operations performed using the database; and
   collecting the historical database usage data based on the monitored one or more database operations.

* * * * *